United States Patent
Kumar et al.

(10) Patent No.: US 10,452,436 B2
(45) Date of Patent: Oct. 22, 2019

(54) SYSTEM AND METHOD FOR SCHEDULING WORKLOAD BASED ON A CREDIT-BASED MECHANISM

(71) Applicant: Cisco Technology, Inc., San Jose, CA (US)

(72) Inventors: Rajesh Kumar, Palo Alto, CA (US); Amit Mittal, San Francisco, CA (US); Anjali Gugle, Cupertino, CA (US); Hetal N. Badheka, Sunnyvale, CA (US); Vasantha K. Tammana, San Jose, CA (US); Priyatam Prasad Veyyakula, Mountain House, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 101 days.

(21) Appl. No.: 15/861,255

(22) Filed: Jan. 3, 2018

(65) Prior Publication Data
US 2019/0205164 A1    Jul. 4, 2019

(51) Int. Cl.
*G06F 9/44*     (2018.01)
*G06F 9/48*     (2006.01)
(Continued)

(52) U.S. Cl.
CPC ............ *G06F 9/4881* (2013.01); *G06F 9/505* (2013.01); *G06F 9/5011* (2013.01); *G06F 9/5083* (2013.01); *G06F 11/3428* (2013.01)

(58) Field of Classification Search
CPC .................................................. G06F 9/4881
(Continued)

(56) References Cited

U.S. PATENT DOCUMENTS 6,714,960 B1    3/2004  Bitar et al.
9,436,512 B2 *  9/2016  Peng ..................... G06F 9/5083
(Continued)

FOREIGN PATENT DOCUMENTS

WO    WO 2014/124448    8/2014

OTHER PUBLICATIONS

International Search Report and Written Opinion from the International Searching Authority, dated Apr. 3, 2019, 18 pages, for corresponding International Patent Application No. PCT/US18/67476.

(Continued)

*Primary Examiner* — Evral E Bodden
(74) *Attorney, Agent, or Firm* — Polsinelli PC

(57) ABSTRACT

Disclosed is a method and system for using a credit-based approach to scheduling workload in a compute environment. The method includes determining server capacity and load of a compute environment and running a first benchmark job to calibrate a resource scheduler. The method includes partitioning, based on the calibration, the compute environment into multiple priority portions (e.g. first portion, second portion etc.) and optionally a reserve portion. Credits are assigned to allocate system capacity or resources per time quanta. The method includes running a benchmark job to calibrate a complexity of supported job types to be run in the compute environment. When a request for capacity is received, the workload is assigned one or more credits and credits are withdrawn from the submitting entity's account for access to the compute environment at a scheduled time.

20 Claims, 6 Drawing Sheets

(51) Int. Cl.
*G06F 9/50* (2006.01)
*G06F 11/34* (2006.01)
(58) Field of Classification Search
USPC .......................................................... 718/105
See application file for complete search history.

(56) References Cited

U.S. PATENT DOCUMENTS

| 9,996,442 B2* | 6/2018 | France ................ G06F 11/3428 |
| 2007/0011683 A1 | 1/2007 | Helander |
| 2011/0154353 A1 | 6/2011 | Theroux |
| 2013/0179881 A1 | 7/2013 | Calder et al. |
| 2015/0046279 A1 | 2/2015 | Wang |
| 2015/0277987 A1 | 10/2015 | Di Balsamo et al. |

OTHER PUBLICATIONS

Buyya et al., "Economic models for resource management and scheduling in Grid computing," Concurrency and Computation: Practice and Experiance, Concurrency Computat.: Pract. Exper. 2002, vol. 14, Jan. 2002, pp. 1507-1542.

\* cited by examiner

SYSTEM AND METHOD FOR SCHEDULING WORKLOAD BASED ON A CREDIT-BASED MECHANISM

TECHNICAL FIELD

The present disclosure relates to using a currency abstraction, or credits, for modeling compute resource availability and resource entitlement in which credit-based bookkeeping is used to characterize available compute capacity and credits are assigned to workload based on anticipated resource usage.

BACKGROUND

The present disclosure relates to scheduling workload to be run in compute environments. Many Software as a Service (SaaS) systems support the non-real time generation of analytics reports covering large data domains (e.g. 40K network devices) and extended time periods (e.g. a quarter). With the growing need to leverage analytics (both near real-time and off-line) to enhance service value add, such report generation capabilities will increase in importance.

Off-line reports are generally scheduled and provided with a regular cadence (e.g. once a quarter), or generated on-demand (albeit with processing delay) in response to a user request. This may require analyzing large volumes of data obtained from a data lake or a structured database.

Unless there is massive overprovisioning of resources, there can be undesirable effects such as unacceptable indeterminate delays during times of peak demand which could have been avoided by prioritized schedule management. Another undesirable effect is that resources can lie fallow for long periods when they could have been used for lower priority users/jobs.

Another issue is the lack of a simple internal bookkeeping mechanism for managing subscription level or transactional pricing vs. task volume and completion delay. This has the unfortunate side-effect of the system not being able to deduce and communicate any tiered upsells (e.g. conversion from a bronze level to a silver level service) that may be needed to handle the user's task throughput needs and latency constraints.

There is a need for a method and apparatus for the automatic allocation of resources to such jobs using a simple abstraction of resource supply and resource entitlement. This should allow the free-market acquisition of resource usage, as well as a policy-based allocation of resources as compensation for past delays or failures or as a means for acquiring new customers. Simple and accurate resource bookkeeping will also facilitate customer upsells, and guide new infrastructure provisioning.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
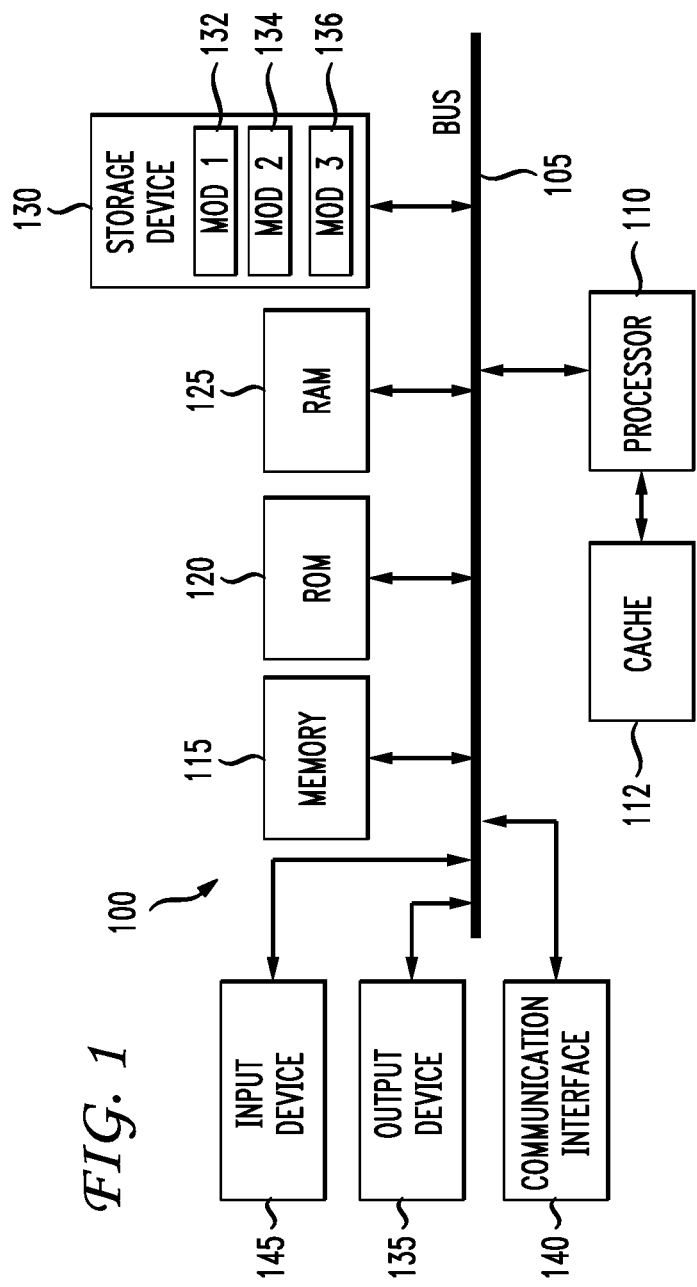
FIG. 1 illustrates an example system configuration.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed is a system and method for scheduling workload in a compute environment. An example method includes determining server capacity and load of a compute environment to yield a system analysis, running a first benchmark job to calibrate a resource scheduler to yield a first calibration and partitioning, based on the first calibration, the compute environment into multiple priority portions, such as a first priority portion and a second priority portion. These portions can be a high priority portion, a standard priority portion, a reserve portion, or any other defined portion. For example, the first priority portion can be a premium portion of the compute environment having a higher cost in credits to use relative to a cost in credits to use the second priority portion of the compute environment. For example, to use 1 "credit" of the premium portion of the compute environment, an entity might have to pay 4 or 5 "credits" from their account. Using a certain priority portion of the compute environment can cost an additional amount of credits over the assigned amount of credits for the resource. Thus, to use one credit of a resource can cost two or more credits by an entity, or even incrementally more than one credit. Users can request partitions in the compute environment having a particular priority or a hybrid of different priorities for different portions of a job.

The method can include assigning, based on the system analysis, a plurality of credits per time period to the compute environment, wherein each credit of the plurality of credits represents an abstraction of compute environment capacity within the compute environment to run workload in the compute environment and running a second benchmark job to calibrate a complexity of supported job types to be run in the compute environment to yield a second calibration. The workload can include non-real-time workload or real-time workload, or a hybrid of both. The method includes receiving, at the resource scheduler, a request from an entity to run workload within the compute environment and assigning, based on the second calibration and by the resource scheduler, one or more credits to the workload associated with the request for one or more time periods based on the compute environment capacity and one or more of a job size associated with the workload and a job complexity of the workload. The job complexity can be determined relative to the second calibration or relative to any other factor such as one or more of bandwidth needed, data amount needed, processor time needed, and so forth.

The system can charge, based on the request, an account of the entity the one or more credits and schedule the workload into one of first priority portion of the compute environment or the second priority portion of the compute environment by applying the one or more credits charged from the account of the entity to the plurality of credits, wherein an amount of compute resources in the compute environment at a scheduled time is allocated to the workload.

In some cases, the resource schedule can be called a resource optimizer. The effort by the scheduler/optimizer is to improve the scheduling of workload within the compute environment such that a more efficient and priority based scheduling of workload can occur. It is specifically noted that the end result of the scheduling may not literally be the "optimal" scheduling approach. Thus, reference to an "optimizer" or an "optimal" scheduling does not literally mean an optimal result, but rather refers to the scheduling process using the credit based approach which can improve the scheduling decisions.

DETAILED DESCRIPTION

The present disclosure addresses the issues raised above. The disclosure provides a system, method and computer-readable storage device embodiments. First a general example system shall be disclosed in FIG. 1 which can provide some basic hardware components making up a server, node or other computer system.

First a general example system shall be disclosed in FIG. 1, which can provide some basic hardware components making up a server, node or other computer system. FIG. 1 illustrates a computing system architecture 100 wherein the components of the system are in electrical communication with each other using a connector 105. Exemplary system 100 includes a processing unit (CPU or processor) 110 and a system connector 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules/services can control or be configured to control the processor 110 to perform various actions. Other system memory 115 may be available for use as well. The memory 115 can include multiple different types of memory with different performance characteristics. The processor 110 can include any general purpose processor and a hardware module or software module/service, such as service 1 132, service 1 234, and service 3 136 stored in storage device 130, configured to control the processor 110 as well as a special-purpose processor where software instructions are incorporated into the actual processor design. The processor 110 may essentially be a completely self-contained computing system, containing multiple cores or processors, a bus (connector), memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software services 131, 134, 136 for controlling the processor 110. Other hardware or software modules/services are contemplated. The storage device 130 can be connected to the system connector 105. In one aspect, a hardware module that performs a particular function can include the software component stored in a computer-readable medium in connection with the necessary hardware components, such as the processor 110, connector 105, display 135, and so forth, to carry out the function.

At the core of this invention is the Resource Optimizer (FIG. 1). It uses a currency-like mechanism ('credits') to model and schedule batch data handling resources: available resources, resources assigned to a job based on its complexity and size, and a customer's entitlement to resource usage. Like national currencies, credits serve as a simple and useful abstraction of supply and demand for use by the Resource Optimizer. Any detailed assignment of hardware resources (cores, memory etc.) is done by the Operating System after the optimal credit allocation has been computed.

Figure 2:
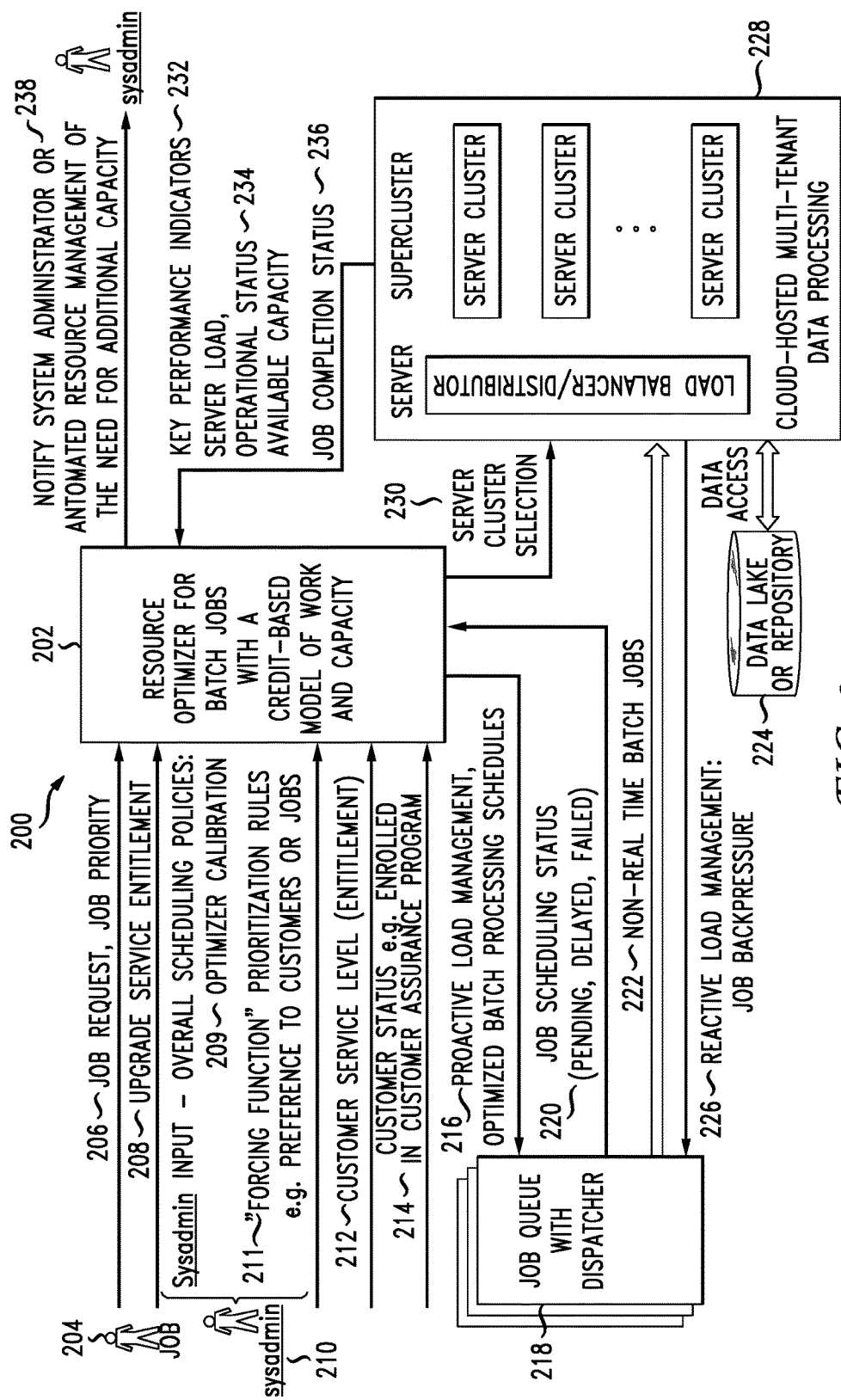
FIG. 2 illustrates an example configuration of the resource optimizer.

The following disclosure relates to an apparatus called the resource optimizer 202 shown in FIG. 2 as part of a system 200 for scheduling workload in a compute environment. The resource optimizer or resource scheduler 202 provide an innovative use of the simple yet powerful currency model described herein to schedule resources at specific times for specific jobs. The model can include earmarking a fraction of the total capacity to be priced at a premium (even if the underlying infrastructure is the same) in order to allow highly priced, high priority jobs to be scheduled ahead of normal jobs without bumping the latter. Where applicable, it also allows a premium to be charged for running jobs at certain preferred times.

Another innovative use of a currency model to easily achieve several operational and optimization goals such as economically sound cutbacks during a loss of capacity, and for forward-looking capacity planning and/or scheduling. The planning or scheduling can be done by the system, or by human administrators. The resource optimizer 202 can drive a resource orchestration system (such as Mesos/Marathon or Kubernetes) for the spawning and decommissioning of VMs, containers etc. It is specifically noted that the reference to an "optimizer" or "optimizing" the scheduling of workload or use of the compute environment does not necessarily mean absolute, technical optimization of scheduling such that 100% of compute resources are in use every time slice. Rather, references to optimization or the like refer to seeking to improve scheduling of workload in a compute environment in a more efficient and fair way over traditional load balancing or other scheduling approaches.

FIG. 2 shows a functional representation of the concept which is described below in detail. FIG. 2 does not illustrate a sequential flow diagram but a non-sequential listing of system interactions.

One concept is the use of credits as a means of quantifying data processing capacity and costs. Broadly speaking, a credit is convenient unit of work which a customer may extract from a system. The credit can include, for example, access to one or more processors, an amount of memory, bandwidth, or any combination of system resources and can also be associated with a specific time slice such as a minute, second, five minutes, or any time quantum or slice. A credit can be defined with respect to a reference job discussed below.

The number of credits that a system can support (its carrying capacity) is calibrated at the time of resource optimizer 202 setup. Tasks are scheduled with the granularity of a time quantum or slice.

The number of credits allocated and the length of time depends not only on available system capacity vis-a-vis the priority of the job, but also on job size and complexity. In one aspect, jobs are scheduled by allocating a fixed credit level across one or more contiguous time quanta. In another aspect, the time quanta might be non-contiguous such that unused time quanta could be scheduled for a job. Thus, a job may be assigned 20 credits for 5 contiguous minutes or for 5 minutes that are used in a non-contiguous manner. In another aspect, the credit level allocated to a job may be different across multiple time quanta. The same job may be assigned 20 credits for the first 3 minutes and 10 credits for the next 4 minutes. These minutes and or physical placement of processing in the compute environment can be contiguous or non-contiguous.

At the time of resource optimizer calibration 209 as shown in FIG. 2, the system administrator 210 runs a benchmark reference job to determine the capacity of the system 228 in terms of credits. The administrator 210 may then segment the capacity into available capacity and reserve capacity. Other granularities could be used as well such as a first priority portion, a second priority portion, a reserve portion, and so forth. Available capacity is used to schedule normal and high-priority tasks using a tiering mechanism. Scheduling is done on user request 206 from a user or entity 204, or per a pre-set cadence (e.g. once a week), or on a variable cadence or triggered timing. Reserve capacity is used for fault-tolerance, for addressing CAP (Customer Assurance Program) cases 214 etc. The system can implement a forcing function to give preference to particular customers or for particular workload 211. Setup can be associated with both the administrator 210 and the tasks of providing input, implementing scheduling policies, calibration 209, and prioritization rules being established 211.

Barring the 'reserve capacity' reserved to cater to non-functional needs such as fault tolerance, the resource optimizer 202 assigns the available capacity of each time quantum to job requests 206 generated based on user request, or per a pre-set cadence (e.g. once a week). Credits are deducted from a user's account based on anticipated resource usage. In one aspect, at the end of the job, the deduction may be adjusted to reflect actual usage.

The system of credits is primarily for internal planning and for automated bookkeeping and resource scheduling tasks. In most cases, the bookkeeping will not be exposed to users. Users may only need to know relevant factors such as expected task delay, the cost in real money for a non-subscription user to schedule an individual task with a certain priority or the subscription level needed to support a given mix of task volumes at specific priority levels. In another aspect, a user interface could provide a graphical, textual, or multi-modal report with data about credits used, credits available, upgrade options, confirmations, and any other interaction that might be useful or necessary to use the credit based system disclosed herein.

The credit abstraction allows the scheduler 202 and the system administrator 210 a more tractable quantification of resources as compared to infrastructure details such as CPU cores, memory etc. At the time of system calibration in terms of credits, credit counts naturally map into physical cores (or virtual cores or hyper-threads) in the server cluster 228. Thus, allocating a certain number of credits for a time period is similar to the assignment of a certain number of cores/hyper-threads. The level of granularity is adequate for large data crunching jobs running on a server cluster. The allocation of other resources such as memory can be a direct function of CPU allocation. Resource mappings that are more complex and granular are possible, but are not necessary. Mapping credits into cores/hyper-threads can require credit counts to be rounded up to the minimum granularity of a core of hyper-thread. Actual allocation and policing of resources is done by operating systems (such as Linux) in response to input from the resource optimizer/resource scheduler 202.

The disclosure now addresses the concept of reserve capacity for covering outages and degradations. The assignment of usable credits allows a certain reserve capacity for fault-tolerance in the case of malfunctions and degradations. The approach provides a safety margin for customer service level agreements (SLAs) 212 to be met when there is a malfunction or key performance indicator (KPI) degradation (features 232, 234 of FIG. 2). As a result, the customer never (or very rarely) has credits that cannot be used because of a malfunction. For example, a system that is sized at 150 credits per time quantum can have 100 credits as available capacity and 50 credits (33.33% of the total) as reserve capacity. In one implementation, the resources represented by reserve credits can be allowed to lie fallow for quick recovery from resource outages. In another implementation, the extra credits may be used to boost performance beyond contractual SLAs or non-contractual service objectives with the proviso that they be released when needed for fault-tolerance.

For service subscriptions, a user is allocated a periodic (e.g. weekly, daily, monthly, or on a variable time basis or based on a reward for performing certain actions, such as voluntarily delaying workload, or paying extra money) quota of credits during the subscription period. The credits are consumed by the tasks scheduled for that week. Credit consumption by a task is proportional to task size and complexity, as well as any prioritized treatment procured for the task.

Unused credits expire at the end of each allocation period (e.g. a week, or other time frame, or based on another triggering action like demanding immediate access to the compute environment) to prevent situations where successive rollovers cause all or most users to possess a count of credits far in excess of what they need, thereby rendering the free market mechanism of resource procurement ineffective.

The periodic credit quota allocated to a user depends on their subscription level (e.g. platinum, gold, silver, bronze etc.) and any other criteria (e.g. service bundle) that are factored in the service purchase. For example, service A at a gold level might result in the user being assigned 20,000 credits per week, while a combination of service A and service B at the bronze level results in a weekly quota of 10,000 credits. Transactional service procurement by non-subscription users is not precluded. The dollar amount of the purchase can be mapped by the system into credits that the system uses to schedule the task. For example, a user 204 may make a one-time payment of $200 to request a report. The system will map this into, say, 1000 credits of which 900 are actually used to generate the report.

When a user 204 upgrades or downgrades their subscription level 208, their credit quota is increased or decreased. The upgrade or change can be applied for the next credit expiration interval (a week in one example) or for the current one. Any one of several proration policies can be adopted.

Credits allocated to users are fungible. One credit is as good as another, just as there is no difference between this dollar and that dollar. The use of credits in this manner does not preclude a fraction of the system capacity (say 10%) from being earmarked for high-priority jobs. This capacity is offered with a multiplicative markup, e.g. 400% of its normal value in credits even if the underlying infrastructure is the same. With a 400% markup, one credit's worth of capacity is offered for a price of five credits. This enhances the availability of resources for high-priority jobs, and obviates the need for bumping lower-priority jobs in order to make room for higher-priority jobs. Of course any markup is possible, such as a 110% markup where it only costs a bit more than normal. Similarly, credits can also be valued such that one user credit can "purchase" more compute capacity relative to a standard amount of compute capacity for a single credit as well.

Note that there can be multiple levels of markup. For example, 10% of capacity can be offered with a 400% markup, another 10% offered with a 300% markup, another 10% offered with a 200% markup and the remaining 70% of capacity offered without any markup. Markdowns can be applied as well. Markups and markdowns, if any, of particular chunks of capacity can be fine-tuned to actual supply and demand profiles. Markdowns can be for any reason, such as for older hardware that is not normally used, where there is extra capacity, based on a user profile or user history.

The 'premium' system capacity will fill up slower than 'normal' capacity, thereby facilitating earlier availability of premium capacity, albeit at a higher price. It is preferable, however, that premium markups be sufficiently high to discourage their casual use in normal circumstances. Also, chunks of premium capacity may be selectively deprecated to the normal level if they are expected to remain unused.

Next, the assignment of credits to jobs is discussed. In the following example, assume that tasks are scheduled in increments of one minute (the time frame could be smaller or larger). Consider the most complex data processing task known at the time of resource optimizer 202 set-up 210. This may be the most complex analytics-based report. The system 200 will use its complexity as a benchmark (called "benchmark complexity" henceforth), not precluding the system from handling more complex job types after set-up.

Assume that by running benchmark test jobs during calibration (the calibration step in group 210 of FIG. 2), the system determines that it can process 100 GB of data of "benchmark complexity" in 1 minute. The system can arbitrarily assign an available capacity of 100 credits to the cluster of servers 228 that make up the compute environment as being the equivalent of the ability to process 100 GB of benchmark data in 1 minute. Assume also, for this example, that the system 228 has an additional unused reserve capacity of 50 credits (100+50=150 credits total). Also assume that the resources to be allocated are from a duster of six servers such that each server hosts 25 cores or hyper-threads. The hypothetical example is constructed for simplicity. In real life, the number of cores in one genre of a server is 24 rather than 25. In this example, 150 credits are mapped into 150 cores. Of these, 100 cores are 'available capacity' while the remaining 50 cores are 'reserve capacity'. As noted herein, even more priority portions or partitions could be made. In order to not complicate the elucidation of the main concept, other infrastructure resources such as memory are not factored into this example. It is assumed that memory assignment is proportional to that of the cores. In other example, the memory assignment may not be proportional but can be based on other factors.

It is generally assumed that the work done is linearly proportional to CPU resource assignment for the processing of large files that are a concatenation or aggregation of similar data sets. With this assumption, if the allocation of 100 credits to the processing of 100 GB of benchmark data results in job completion in 1 minute, then allocating 10 credits to the job will require a contiguous period of 10 minutes for job completion. These assignments and use of credits will also allow the system to schedule several concurrent tasks with different performance characteristics, and with the possibility of task tiering (prioritization) described above. Also, the job size remains constant at 100 credits regardless of how long it takes (depending on the credit allocation per minute).

The system capacity for work in one time quantum (one minute) in this example is 100 credits. By extension, its capacity for work in a week is approximately 1 million credits (1,008,000)—not counting a reserve capacity of about half a million credits (504,000) in a week.

When the system uses credits on the user's behalf to reserve capacity for a one-time job or for a recurring (say weekly) job, it must estimate the work associated with the request in terms of credits. To do this, it is valuable to factor in (1) The size of the job in, say, GB and (2) The complexity of the job as compared to the benchmark job used to calibrate the system. Scheduled jobs fall into one of a finite number of job categories, such as the types of analytics reports that may be ordered. The complexity of a job type is defined in one aspect as the ratio of the time taken, with a chosen credit allocation (say 10 credits), to process a standard file size (say 100 GB) associated with the job type to the time taken to process the same file size (100 GB) of the benchmark job type (see above) using the same credit allocation (10 credits).

The ratio K (representing the complexity of a job type) is defined as follows:

$$K = T\text{-actual}/T\text{-reference},$$

where T-actual is the time needed to process a reference size (100 GB) of the job in question using a reference resource allocation (say 10 credits), and T-reference is the time needed to process the same size (100 GB) of the benchmark job (see above) using the same resource allocation (10 credits). Recall that the benchmark job type is the most complex job type at the time of system calibration, even though more complex job types may be added to the supported set of jobs types post-calibration. There are also other approaches to calculating the complexity of a job type as well and this disclosure is not limited to the particular calculation above.

At the time of system calibration, each supported job type will therefore be assigned a complexity (K) value in the following range:

$$0 < K <= 1$$

Following system calibration, new job types with K>1 might be created. When this is done, there is no need to re-define the benchmark job type used for system calibration. The cost of a specific job in terms of credits (work units) is:

$$\text{Task cost} = C1 + K \times S \times C2$$

Where K is the task complexity, defined above, S is the volume of data to be processed in GB, C1 is the fixed capacity/cost in credits (independent of the volume of data to be processed) needed per task due to factors such as context switching, C2 is the capacity/cost in credits needed to process 1 GB of the benchmark job. This cost is independent of the volume of data to be processed. In one definition, the cost is 1 credit but it could be something else in another system characterization.

For example, consider a data processing job type that generates analytic reports from 'big data'. The complexity of this genre of report is determined a priori by running this report on 100 GB of data with a 10 credit resource allocation. This is found to take 9.35 minute. It is also found that the time to process 100 GB of benchmark data with a 10 credit resource allocation is 11 minutes. The complexity factor for this type of report is therefore 9.35/11=0.85.

Now assume that the system runs this genre of analytics report on 1 TB of big data. Also assume that all jobs require a fixed overhead cost (C1) of 30 credits. The total cost of this specific task is then found to be:

$$C1 + K \times S \times C2 = 30 + 0.85 \times 1000 \times 1 = 880 \text{ credits}$$

Now, the system 200 has been characterized as having a capacity of doing 100 credits worth of work in each one minute interval, which is the time quantum used for scheduling jobs on our example system. If the entire system were dedicated to this job, then job completion would take 880/100=8.8 minutes.

Assuming that several jobs may run on this system and that the user is allocated only 40 credits of capacity for the duration of the job. The duration of the job will then be 880/40=22 minutes.

Prior to scheduling the job, the system first determines whether the user has 880 credits in their account. Assume that the user has a weekly allocation of 10,000 credits and at the time when the job is scheduled, the remaining balance is 6,000 credits. The balance in the account allows the system to schedule the job since it falls within the user's resource entitlement 212. Also, note that the system 200 has an overall capacity of about 1 million credits (see above) for the period of a week.

The system will schedule data crunching jobs with the objective of early completion, i.e. at the earliest available time. If a scheduler is used which predicts future usage, the job could be schedule at a specific time or a range of times in the future. For batch collection file upload jobs, there may be specific time intervals that users may prefer, such as nights or weekends, or other times since such scheduling can place the least strain on the environment. The system 202 could use machine learning to gather data about patterns of entity requests for job processing such that preferred times could be predicated and implemented in scheduling.

The resource optimizer/resource scheduler 202 will provide proactive load management by providing optimized or improved batch processing schedules 216 to a job queue with the dispatcher 218. The dispatcher 218 can use a data lake 224 which stores data about the data processing. Data from the job queue with dispatcher 218 is provided 220 to the resource optimizer 202 such as the pending jobs, delayed jobs, failed jobs, jobs being run, and so forth, to aid the optimizer 202 it is decision making process.

The optimizer 202 can provide system notifications to an administrator 238 about the need for additional capacity, such as requesting server capacity from an automated resource management system. The optimizer 202 can also perform server cluster selection 230. The job queue with dispatcher 218 can provide the batch jobs 222 to the actual server cluster 228. These can be non-real time batch jobs or could be any job, including real time jobs. The compute environment 228 can also provide data about load management such as job backpressure 226 to the dispatcher 218. The compute environment 228 can provide a key performance indicator 232 to the optimizer 202, as well as other data such as server load, operational status, and available capacity 234, including job completion status 236 and any other data about the job performance. The compute environment 228 can be any cloud-hosted multi-tenant data processing center.

Figure 3:
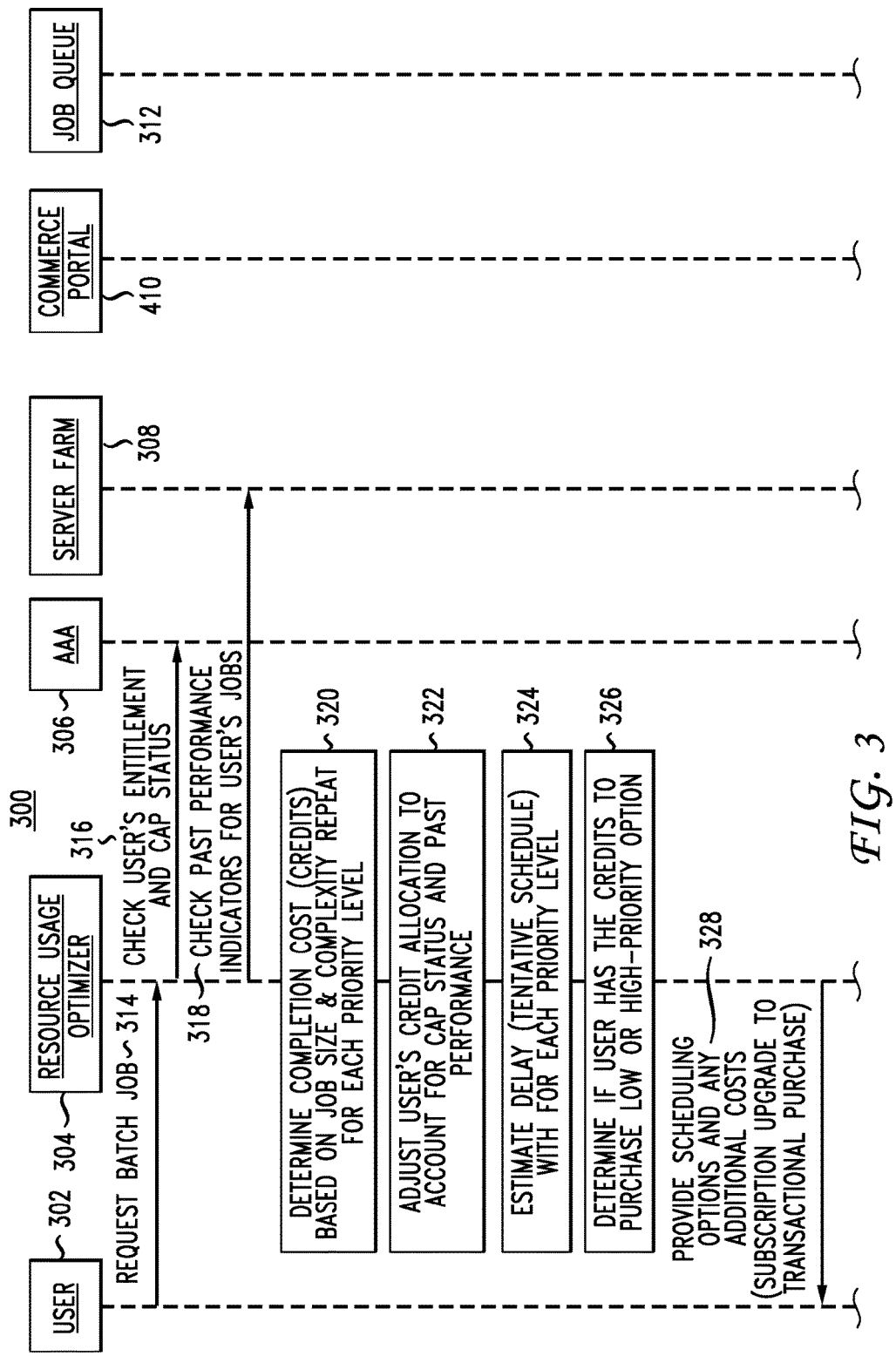
FIG. 3 illustrates the operational tasks for the resource optimizer.
Figure 3:
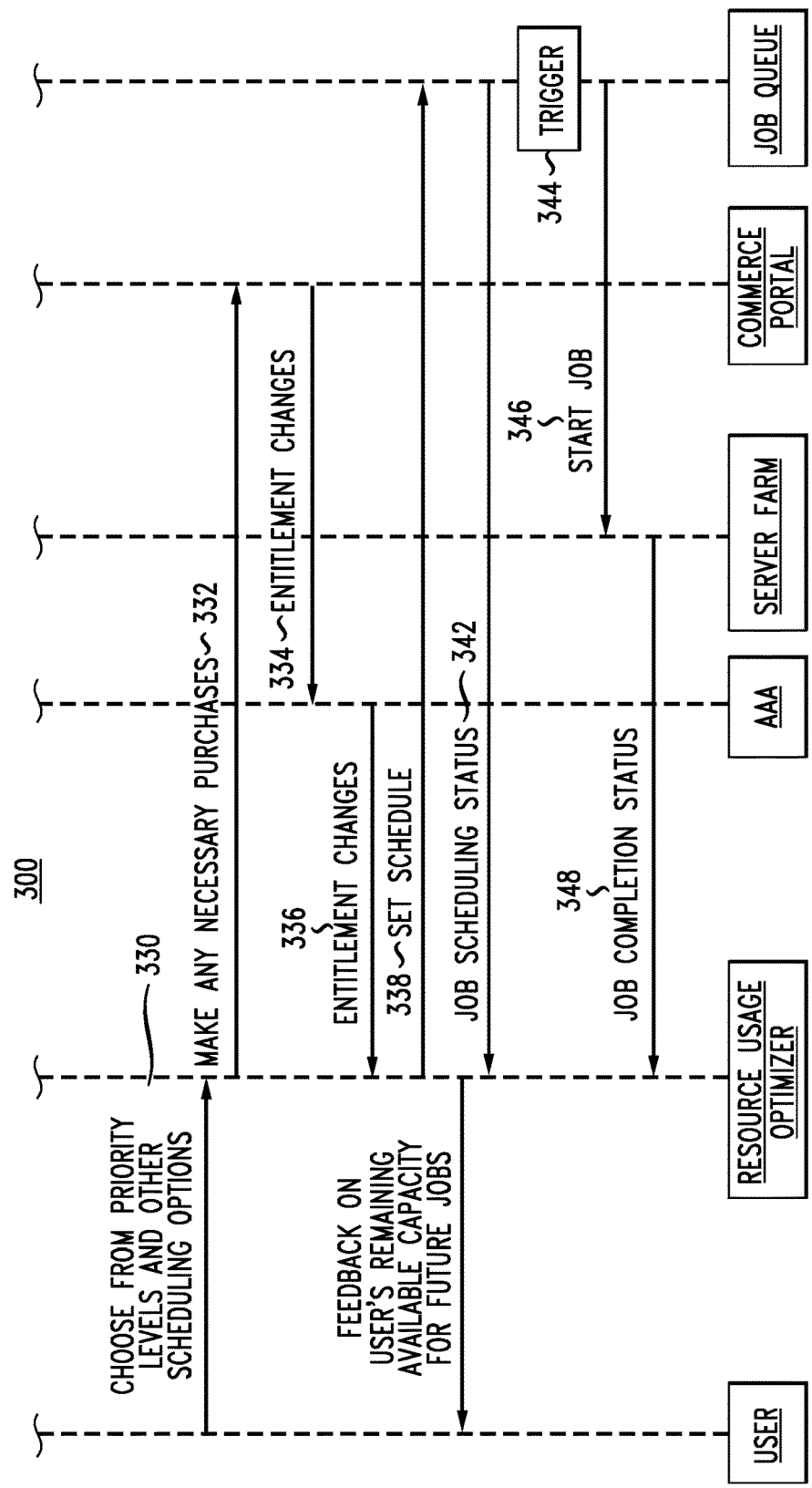

Job scheduling is described for the batch data processing use case in FIG. 3. As shown in the flow diagram, scheduling interaction with the user is in terms of common constructs such as job size, complexity, delays and priority levels. In the case of batch file uploads, an additional parameter of interest during scheduling is the calendar time of job start since certain times during a week may be preferred to others. Also, the uniform credit-based quantification of task effort, resource availability and service entitlement may, under certain business models, be exposed to the customer—although the more common approach will be to not do so.

Figure 4:
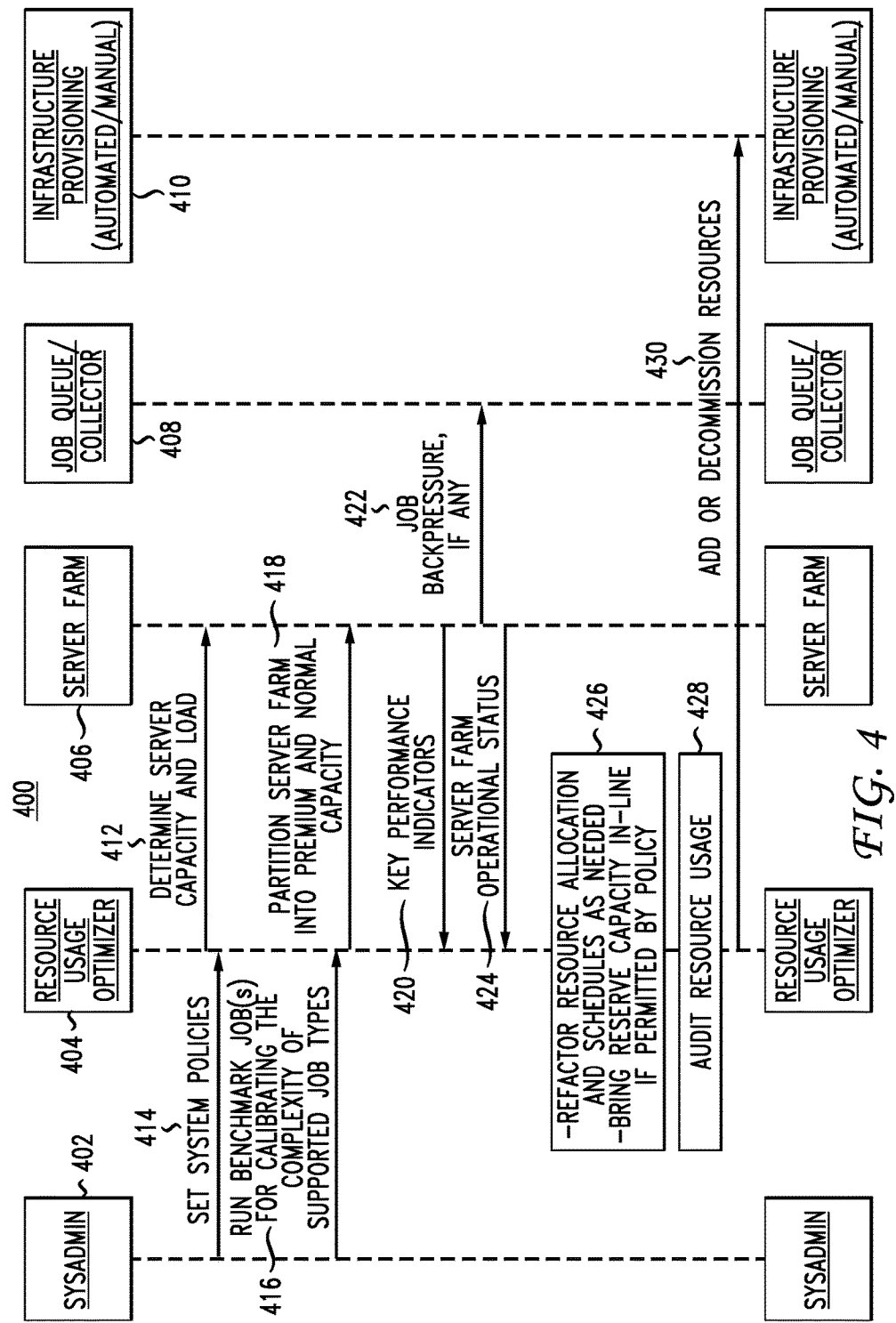
FIG. 4 illustrates the operational tasks for scheduling a batch data processing job.

In FIG. 3, the signal processing 300 shows a resource optimizer 304 that computes, for each supported priority level, the resource cost (in credits) for the requested job, using the file size and the complexity of the analytics report. The steps in these figures are not necessarily in order and can be performed in any order. The complexity factor of the requested report needs to have been pre-calibrated (FIG. 4). The resource optimizer 304 also performs a number of tasks for the user 302. The user has submitted a request for a job or jobs 314, and after the optimizer 304 checks with a service 306 for the user's entitlement and CAP status 316, and checks past performance indicators for the user's jobs with the compute environment 308, the optimizer 304 can determine a completion cost (in credits) based on one or more of the job size and complexity 320. The system can repeat this step for each priority level. The system can adjust the user's credit allocation to account for CAP status and past performance 322. The system can estimate a delay for each supported priority level 324, given the task mix, which can represent a tentative schedule for each priority level. The system can determine if the user has the credits to purchase a low priority or high priority, or other priority, option 326 to use compute resources 308. The request for the job to run can include also a request for a priority partition in the environment for running the job.

The delay includes estimates of the wait time and the processing time. In computing the cost in credits of the task, the resource optimizer 304 can boost the user's credit allocation or can provide discounts as a compensatory mechanism for the user being in CAP 214 or having experienced prior performance issues. The user's credit allocation can allow the system 304 to schedule the job at a higher priority based on the boost in purchasing power or the service discount. At this point, the resource optimizer 304 provides the user with the various scheduling possibilities 328 and whether the user needs, because of an entitlement deficit, to upgrade their subscription or make a one-time purchase. After the user has made their choice from priority levels and other scheduling options 330 and makes any necessary purchases 332, and changes 334,346, from a commerce portal 310 and an entity 306, the system schedules the job 338 and provides the user with feedback 340 on their remaining purchasing power until the next, most likely weekly, credit refresh. A job scheduling status can be provided from the job queue 312 to the optimizer 304. A triggering event 344 can cause the job to start 346 in the compute environment 308. The resource optimizer 304 tracks job completion status 348.

FIG. 4 illustrates configuration and other operational tasks (not directly related to task scheduling) that can be performed by a resource optimizer 404. The steps and tasks are not necessarily listed in the order in which they might occur. The tasks can be done several times during the lifecycle of the system in order to keep it up to speed with changing customer demand. The tasks include determining server capacity and load 412, setting system policies 414, and running benchmark jobs for system calibration 416, and partitioning the compute environment into a first type of priority portion and a second type of priority portion 418. These priorities can be group consisting of one or more of a premium, a normal, a low priority or a reserve portion. Generally, the system can partition the compute environment into multiple partitions or portions with different or the same priority assigned to each respective partition or portion. The partitions can be physical, virtual, time-based or hardware based.

The optimizer 404 schedules jobs based on the user input and/or other data such as key performance indicators 420. The compute environment can provide data about job back-pressure to the job queue 422. The operational status of the compute environment 406 can be provided to the optimizer 404. The system tracks server capacity, load and operational status 424. The optimizer 404 can refactor resource allocation and scheduling as needed, and can bring reserve capacity in-line if permit by a policy 426. The optimizer 404 can also audit resource usage 428, and can add/decommission resources (local or cloud) via a manual or automated process 430 which can communicate with an infrastructure provisioning entity 410.

The system disclosed herein can provide a performance boost for customers and situations needing special attention. For example, the system can provide the allocation of additional credits as a mitigation path for customers whose SLAs are not being met (feature 214 in FIG. 2) or whose past jobs have failed or performed poorly (Feature 220 in FIG. 2). For customers whose service has degraded or who are on CAP because of service issues, the allocation of additional credits to their purchasing power might be used boost performance and mitigate the impact of the deficient operation in the past. Performance boosting can imply the assignment of one or more resources in the compute environment, such as additional CPU cores, bandwidth, storage capacity and/or memory. The number of credits in a customer's account is an internal bookkeeping variable that is not normally exposed to customers.

Additional credits can also been made available when scheduling jobs of high overall importance. For example, additional credits can be provided for a real-time job, or when a SaaS provider runs forensic analytics that address security issues or key performance issues affecting their offering. For example, feature 211 in FIG. 2 can relate to a forcing function that implements prioritization rules for preference to customers or jobs. The concept holds even though such tasks subtract from the overall credit pool rather than from the credit allocation of any the SaaS provider's customers.

The system can boost data processing performance by allocating unused available capacity. The resource optimizer 202 tracks performance at the system and customer level (Feature 232 in FIG. 2). It also tracks the available capacity (subject to planned or unplanned downtime) and the current load of the shared, multi-tenant data processing system (Feature 234 in FIG. 2). Where enabled by policy, the feedback can be used by the optimizer 202 to increase the allocation of credits to a customer, in response to pre-set criteria (entitlement 212). Applying unused credits to increase capacity allocation for key customers who do not currently have job failure/latency issues allows the system to improve the delay performance of jobs for these premium customers without negatively impacting other customers.

The system can use a summary of factors contributing to credit usage scheduling and bookkeeping. As shown in FIGS. 2 through 4, the resource optimizer 202 creates the job processing schedules based on user input 206, 208. In doing so, it tracks credit availability and subtracts credits on a per-job basis from a user's credit pool. The optimizer 202 generally makes credit consumption decisions on behalf of the user. As detailed above, these decisions factor in the following elements: (1) Overall policies set by the service provider 210; (2) Customer entitlement 212; (3) Resource availability and use 234; (4) System performance, specific to a customer or a job pertaining to a customer 220, 236, 232; and/or (5) Customer status (e.g. is the customer enrolled in the Customer Assurance Program (CAP)) 214. A Customer Assurance Program can be a program for the remediation of persistent service level violations.

The overall objective of these credit-based task scheduling decisions is to allow more flexibility and less latency to customers who opt for a higher service tier, while providing satisfactory performance outcomes to all service tiers. A secondary objective is to provide the service provider direct visibility into why an upsell might be necessary in order to meet desired service latency goals, and why there might be a need to procure additional compute capacity—perhaps via a cloud-based infrastructure vendor.

In another aspect, the system provides for reactive load management. In addition to the scheduling-based proactive load management 216 provided by the optimizer 202, the server farm or compute environment 228 can apply back-pressure 226 to the job dispatcher 218 or to a collector when the server farm 228 is near a pre-determined capacity. Such reactive load management is intended to provide a further layer of protection to shore up the proactive load management provided by the resource optimizer 202.

The system also provides server cluster mapping to premium and normal tiers. Jobs are routed to a load balancer/distributor which distributes incoming load 222 to a group of servers for data processing. These servers are organized as a super cluster consisting of several server clusters 228.

Geographical redundancy is possible among clusters, and within a cluster. Also, even if the server clusters are hosted on similar server platforms, processing on one server cluster might be intentionally made more expensive in terms of credits for the same work than processing on another server cluster. This is equivalent to the optimizer 202 mapping some clusters to the 'premium capacity' tier described above, while others are by default mapped to the 'normal capacity' tier. Premium clusters, being more expensive, will be less crowded. Note that such segregation of clusters is not needed in order to distinguish between the two tiers.

The system can also provide addition of upload/compute capacity 238. The resource usage optimizer 202 notifies 238 the system administrator or an automated resource management system of the need to add additional capacity based on resource usage patterns and any imminent shortfall that might result in service degradation or denial. In an alternate embodiment, the data acquisition optimizer 202 can drive an automated toolset for acquiring infrastructure resources. Similar notifications to human administrators and/or automated toolsets can be made when resources need to be decommissioned due to underutilization. All of these cases are facilitated by the use of credits as a simple abstraction of resource supply and demand. When resources are added or removed, there is no need to recalibrate the system since the equivalence between resources and credits has already been established. The overall pool of credits is simply increased or decreased in proportion to the change in resource supply.

The system can also provide multiple resource/credit pools. The use of multiple, distinct resource pools is a direct corollary of this disclosure. Systems of resources can be segregated into resource pools such that rights to these pools are purchased separately. An example is when different big analytics services offered by the same vendor use completely different platforms. Another example is when the data centers that may be used are contingent on legal jurisdiction such as customer data from the European Union may not be sent to the US. In such cases, it is necessary to map these distinct resource pools into separate credit pools (whether exposed to the customer or not). For example, resources on the "blue system" may be acquired via "blue credits", while resources on the "red system" may be acquired via "red credits". In this regard, credits in the system or available for users can have associated parameters or metadata that defines how and/or when they can be used.

The system can also provide fine-tuning resource optimization. The resource optimizer 202 can be fine-tuned on a regular basis by human experts or automated systems who can modify system parameters such as the fraction of system capacity assigned to each price tier, price mark-ups and mark-downs for different weekly timeslots, weekly credit allocations for different subscription levels, amount of reserve capacity earmarked for contingencies, customers' weekly credit allowances, and so forth. Also, rules or machine learning techniques can be applied for fine-tuning can be automated so that resource optimizers 202 automatically adapt to changing business rules and customer demand. The machine learning could be used to iteratively optimize system parameter values to meet service fulfillment and assurance objectives.

This disclosure does not address the acquisition of data. It assumes that data is already present in a data lake or repository as shown in FIG. 2. As such, customers do not compete for opportunities to upload data into the data lake or repository 224, and can do so at any time without wait periods resulting from resource shortage. In the case where customers do compete for opportunities (earliest opportunity or specific timeslots), the disclosure can be extended to also provide a free-market model (with policy-based adjustments) of the availability, entitlement and demand for file upload opportunities from customers into the data lake or repository 224, and to optimize the use of such opportunities.

The disclosure uses a currency abstraction ('credits') for modeling compute resource availability and resource entitlement. It provides an efficient, novel mechanism for the optimized priority-based scheduling of non-realtime (or real-time in some cases), compute-intensive jobs such as big data analytics. A tiered bookkeeping mechanism allows high-priority jobs to be scheduled ahead of other jobs, without bumping lower priority jobs. Two bases are used for determining job priority: the service tier, and policy-based compensation for past failures and delays. Scheduling rights are internally quantified as credits. Credit-based bookkeeping is used by the system to track a user's current resource entitlement, and to characterize the available compute capacity and its allocation. Users are allocated credits periodically based on their subscription level. Each job is assigned a certain number of credits based on its anticipated resource usage. At the basic level, scheduling consists of reserving certain credits (as an abstraction of system resources) for specific time intervals, with reserved credit pools for high-priority users and for providing a fault-tolerant safety margin. The credit-based resource model is not exposed to users who only see estimates of task completion and, where needed, a notification that the user must upgrade their service tier in order to get the requested job load (e.g. set of monthly big-data driven reports) addressed. Users are also allowed to select a higher priority for a specific job, provided they have or acquire the requisite entitlement (service tier).

The system provides for the generation of reports based on the analytical processing of large data volumes typically covering large domains and/or time periods. The current approach for handling large data-crunching jobs is to over-provision the compute capacity at a margin (say 20%) above a rated peak load, and to supplement this with the dynamic procurement of additional compute within the data center or an attached cloud ("Resource Orchestration"). Resources are added proactively when statistics indicate a system operating near its maximum capacity, or reactively when jobs experience large wait times or service times. While this may suffice for the present, the need for the intelligent, prioritized scheduling of non-real time compute resources will become more acute as the world is digitized to an even greater degree as part of the IoT revolution.

This disclosure supplements current resource orchestration technologies by providing a load-smoothing method for enhancing the scale and lowering the cost of non-real time, compute-intensive jobs. The novel load smoothing technique offers a non-preemptive approach for prioritized scheduling, while allowing the system a simple and useful abstraction for tracking compute resource availability, entitlement, demand and usage. There is at present no existing batch job schedule optimization solution that accurately factors in all of these variables while still providing a simple and intuitive resource model for operations staff. Besides enabling the enhancement of current resource utilization, this resource tracking method introduces greater determinism into future resource planning and provisioning, whether automated, manual or both.

Figure 5:
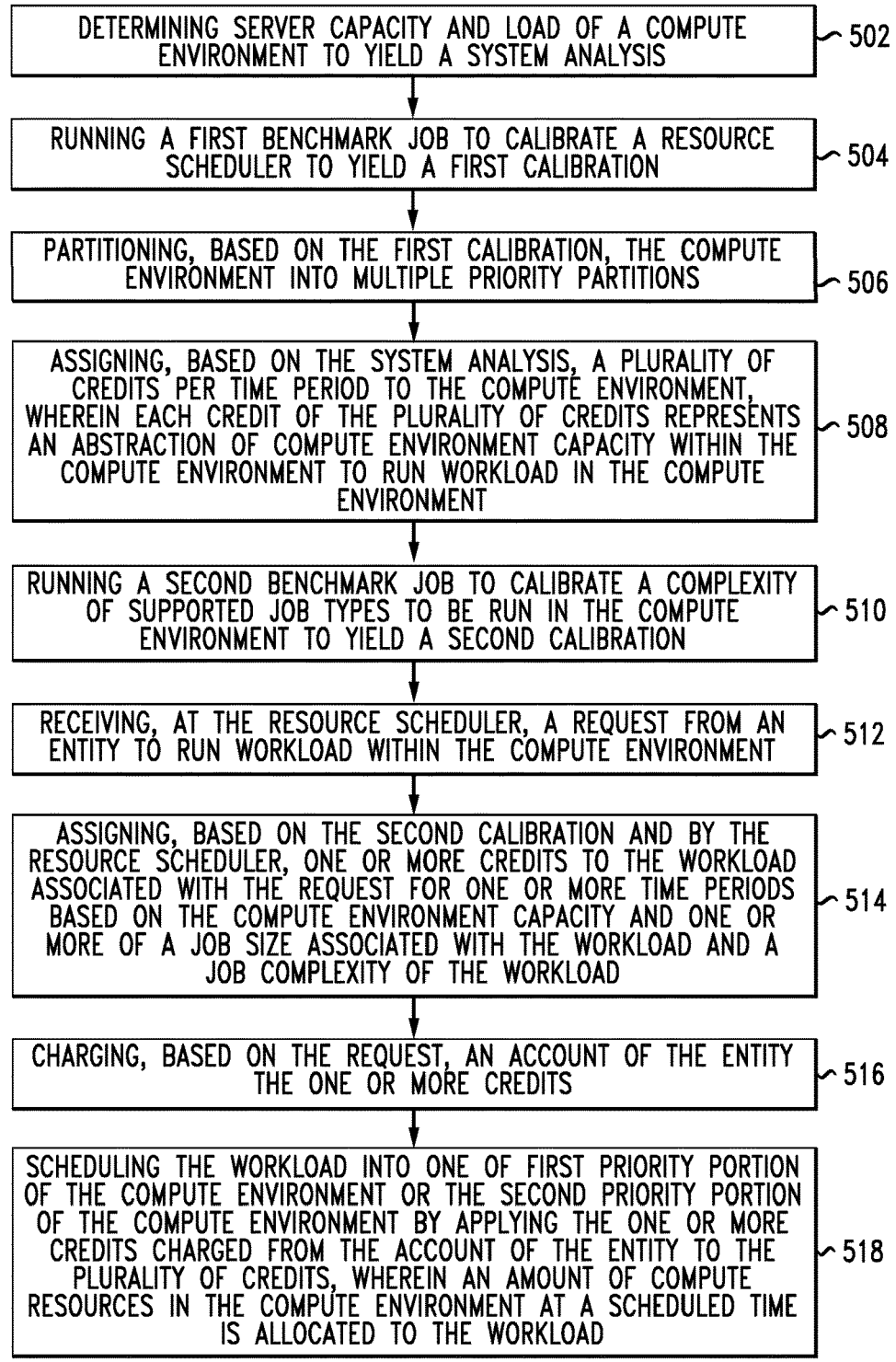
FIG. 5 illustrates an example method embodiment.

FIG. 5 illustrates a method example of this disclosure. The method includes determining server capacity and load of a compute environment to yield a system analysis (502), running a first benchmark job to calibrate a resource scheduler to yield a first calibration (504) and partitioning, based on the first calibration, the compute environment into multiple prioritized partitions or portions, such as a first priority portion and a second priority portion (506). The method can also include partitioning, based on the first calibration, the compute environment into the first priority portion, the second priority portion and a reserve portion, or into any number of different types of portions based on any number of factors. The first priority portion can be a premium portion of the compute environment having a higher cost in credits to use relative to a cost in credits to use the second priority portion of the compute environment. The two portions can also be equivalent in priority and cost of access in credit and divided based on other aspects, such as for categories of users. For example, some users might be from accounting and others might be from research and be allocated to use their credits in different portions of the compute environment. A credit amount of compute resources in the first priority portion of the compute environment can be usable for more than one credit. For example, it may cost 1.1 credits, or two or more credits, to use one credit worth of compute resources in the first priority portion of the compute environment.

The method includes assigning, based on the system analysis, a plurality of credits per time period to the compute environment, wherein each credit of the plurality of credits represents an abstraction of compute environment capacity within the compute environment to run workload in the compute environment (508), running a second benchmark job to calibrate a complexity of supported job types to be run in the compute environment to yield a second calibration (510), receiving, at the resource scheduler, a request from an entity to run workload within the compute environment (512) and assigning, based on the second calibration and by the resource scheduler, one or more credits to the workload associated with the request for one or more time periods based on the compute environment capacity and one or more of a job size associated with the workload and a job complexity of the workload (514). The request in step 512 can include a request to choose between partitions with different priorities. For example, the request may include a requirement for a priority 1 partition, a priority 2 partition or a hybrid of both priorities, for example, for different aspects of the job.

The system can charge, based on the request, an account of the entity the one or more credits (516). Charging the account can be based on the request and require a premium amount of credits from the account of the entity to schedule the workload in the first priority portion of the compute environment. In other words, the charging may charge, for example, 2 credits for the use of 1 credit of resources in the first priority portion of the compute environment.

The method further includes scheduling the workload into one of first priority portion of the compute environment or the second priority portion of the compute environment by applying the one or more credits charged from the account of the entity to the plurality of credits, wherein an amount of compute resources in the compute environment at a scheduled time is allocated to the workload (518). Scheduling the workload can include the resource scheduler assigning one or more of a core, a memory, bandwidth, or storage, to the workload for the scheduled time. The scheduled time can include a plurality of contiguous time quanta or non-contiguous time quanta. The workload can also be assigned to continuous physical or virtual compute resources or non-contiguous physical or virtual resources. The scheduling of the workload into one of first priority portion of the compute environment or the second priority portion of the compute environment further can include scheduling the workload further into a reserve portion of the compute environment based on a priority of the workload or some other factor.

The amount of compute resources in the compute environment at the scheduled time assigned to the workload can be determined based on available capacity in the compute environment relative to a priority of the workload, the job size and the job complexity. The job complexity can be determined relative to the second calibration.

The method can also include the resource scheduler compensating the entity when scheduling the workload in the compute environment based on a triggering event. The triggering event can include one or more of a prior performance issue for the entity, a higher charge to the entity, a delay issue for the entity, and a service level agreement violation.

Entities can be allocated credits on a periodic basis, based on purchases of credits, based on a reward for performing actions, or a combination of events.

When a fault occurs, the scheduling further can include scheduling the workload into a reserve portion of the compute environment, wherein the reserve portion of the compute environment is allocated a portion of the plurality of credits.

In some embodiments. the computer-readable storage devices, mediums, and/or memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method comprising:
   determining server capacity and load of a compute environment to yield a system analysis;
   running a first benchmark job to calibrate a resource scheduler to yield a first calibration;
   partitioning, based on the first calibration, the compute environment into a first priority portion and a second priority portion;
   assigning, based on the system analysis, a plurality of credits per time period to the compute environment, wherein each credit of the plurality of credits represents an abstraction of compute environment capacity within the compute environment to run workload in the compute environment;
   running a second benchmark job to calibrate a complexity of supported job types to be run in the compute environment to yield a second calibration;
   receiving, at the resource scheduler, a request from an entity to run workload within the compute environment;
   assigning, based on the second calibration and by the resource scheduler, one or more credits to the workload associated with the request for one or more time periods based on the compute environment capacity and one or more of a job size associated with the workload and a job complexity of the workload;
   charging, based on the request, an account of the entity the one or more credits; and
   scheduling the workload into one of first priority portion of the compute environment or the second priority portion of the compute environment by applying the one or more credits charged from the account of the entity to the plurality of credits, wherein an amount of compute resources in the compute environment at a scheduled time is allocated to the workload.

2. The method of claim 1, wherein the first priority portion is a premium portion of the compute environment having a higher cost in credits to use relative to a cost in credits to use the second priority portion of the compute environment.

3. The method of claim 1, wherein scheduling the workload comprises the resource scheduler assigning one or more of a core, a memory, bandwidth, or storage, to the workload for the scheduled time.

4. The method of claim 1, further comprising charging, based on the request, a premium amount of credits from the account of the entity to schedule the workload in the first priority portion of the compute environment.

5. The method of claim 1, wherein the scheduled time comprises one of a plurality of contiguous time quanta or a plurality of non-contiguous time quanta.

6. The method of claim 1, wherein the amount of compute resources in the compute environment at the scheduled time assigned to the workload is determined based on available capacity in the compute environment relative to a priority of the workload, the job size and the job complexity.

7. The method of claim 1, further comprising partitioning, based on the first calibration, the compute environment into the first priority portion, the second priority portion and a reserve portion.

8. The method of claim 1, wherein a credit amount of compute resources in the first priority portion of the compute environment is usable for two or more credits.

9. The method of claim 1, wherein the job complexity is determined relative to the second calibration.

10. The method of claim 1, further comprising the resource scheduler compensating the entity when scheduling the workload in the compute environment based on a triggering event.

11. The method of claim 10, wherein the triggering event comprises one or more of a prior performance issue for the entity, a higher charge to the entity, a delay issue for the entity, and a service level agreement violation.

12. The method of claim 1, wherein the workload comprises a non-realtime workload.

13. The method of claim 1, further comprising allocating credits to the entity on a periodic basis.

14. The method of claim 1, wherein scheduling the workload into one of first priority portion of the compute environment or the second priority portion of the compute environment further comprises scheduling the workload further into a reserve portion of the compute environment based on a priority of the workload.

15. The method of claim 1, wherein when a fault occurs, the scheduling further comprises scheduling the workload into a reserve portion of the compute environment, wherein the reserve portion of the compute environment is allocated a portion of the plurality of credits.

16. A resource scheduler comprising:
a processor; and
a computer-readable storage device storing instructions, which, when executed by the processor, cause the processor to perform operations comprising:
determining server capacity and load of a compute environment to yield a system analysis;
running a first benchmark job to calibrate a resource scheduler to yield a first calibration;
partitioning, based on the first calibration, the compute environment into two or more of a first priority portion, a second priority portion and a reserve portion;
assigning, based on the system analysis, a plurality of credits per time period, wherein each credit of the plurality of credits represents an abstraction of a compute environment capacity to run workload in the compute environment;
running a second benchmark job to calibrate a complexity of supported job types to be run in the compute environment to yield a second calibration;
receiving a request from an entity to run workload within the compute environment;
assigning, based on the second calibration and by the resource scheduler, one or more credits to the workload associated with the request for one or more time periods based on compute environment capacity and one or more of a job size associated with the workload and a job complexity of the workload;
charging, based on the request, an account of the entity the one or more credits; and
scheduling the workload into one or more of first the priority portion of the compute environment, the second priority portion of the compute environment, or the reserve portion of the compute environment by applying the one or more credits charged from the account of the entity to the plurality of credits, wherein an amount of compute resources in the compute environment at a scheduled time is allocated to the workload.

17. The resource scheduler of claim 16, wherein the first priority portion is a premium portion of the compute environment having a higher cost in credits to use relative to a cost in credits to use the second priority portion of the compute environment.

18. The resource scheduler of claim 16, wherein scheduling the workload comprises the resource scheduler assigning one or more of a core, a memory, bandwidth, or storage, to the workload for the scheduled time.

19. The resource scheduler of claim 16, wherein the scheduled time comprises one of a plurality of contiguous time quanta or a plurality of non-contiguous time quanta.

20. A computer-readable storage device storing instructions, which, when executed by a processor, cause the processor to perform operations comprising:
determining server capacity and load of a compute environment to yield a system analysis;
running a first benchmark job to calibrate a resource scheduler to yield a first calibration;
partitioning, based on the first calibration, the compute environment into a first priority portion, a second priority portion and a reserve portion;
assigning, based on the system analysis, a plurality of credits per time period, wherein each credit the plurality of credits represents an abstraction of a compute environment capacity to run workload in the compute environment;
running a second benchmark job to calibrate a complexity of supported job types to be run in the compute environment to yield a second calibration;
receiving a request from an entity to run workload within the compute environment;
assigning, based on the second calibration and by the resource scheduler, one or more credits to the workload associated with the request for one or more time periods based on compute environment capacity and one or more of a job size associated with the workload and a job complexity of the workload;
charging, based on the request, an account of the entity the one or more credits; and
scheduling the workload into one or more of first the priority portion of the compute environment, the second priority portion of the compute environment, or the reserve portion of the compute environment by applying the one or more credits charged from the account of the entity to the plurality of credits, wherein an amount of compute resources in the compute environment at a scheduled time is allocated to the workload.

* * * * *